Figure 1:
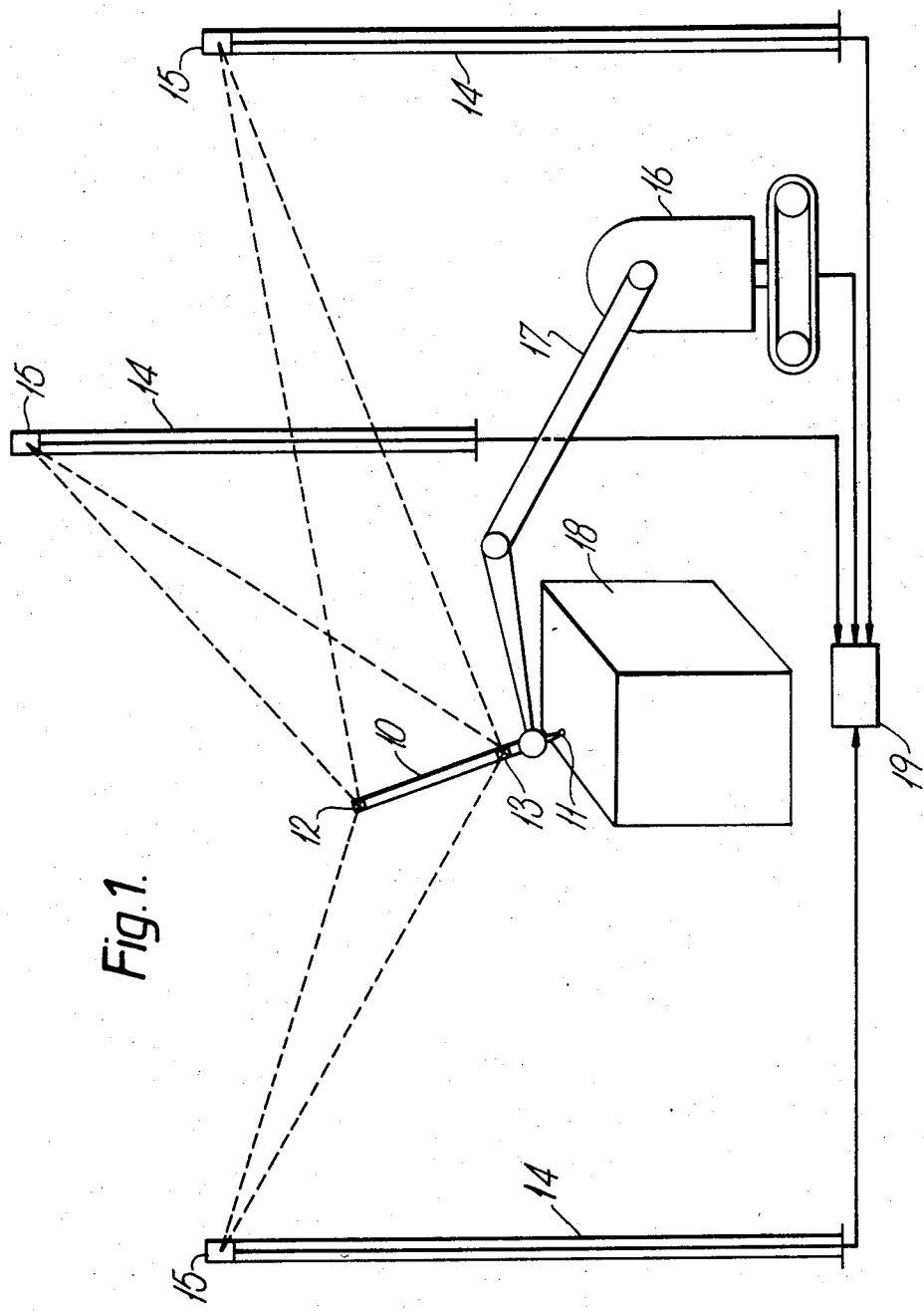

United States Patent [19]

Pitches et al.

[11] Patent Number: 4,691,446
[45] Date of Patent: Sep. 8, 1987

[54] THREE-DIMENSIONAL POSITION MEASURING APPARATUS

[75] Inventors: Brian E. Pitches; David A. Wright, both of Edinburgh, Scotland

[73] Assignee: Ferranti plc, Cheshire, England

[21] Appl. No.: 902,655

[22] Filed: Sep. 2, 1986

[30] Foreign Application Priority Data

Sep. 5, 1985 [GB] United Kingdom ............... 8522058

[51] Int. Cl.$^4$ ............................................. G01C 3/10
[52] U.S. Cl. .................................... 33/516; 33/1 CC; 33/1 MP; 33/DIG.21; 356/1; 414/730; 901/47
[58] Field of Search ................... 33/1 MD, 516, 1 CC, 33/DIG.21; 356/1, 152, 4; 901/47; 414/730

[56] References Cited

U.S. PATENT DOCUMENTS

| 4,441,809 | 4/1984 | Dudley et al. | 356/1 |
| 4,490,919 | 1/1985 | Feist et al. | 33/DIG. 21 |
| 4,568,182 | 2/1986 | Modjallal | 356/1 |
| 4,575,237 | 3/1986 | Suzuki | 356/1 |

FOREIGN PATENT DOCUMENTS 48510 5/1981 Japan ..................................... 356/1

Primary Examiner—William D. Martin, Jr.
Attorney, Agent, or Firm—Kerkam, Stowell, Kondracki & Clarke

[57] ABSTRACT

Apparatus for determining the position of a point movable throughout a measuring volume relative to a set of reference axes includes a probe member (10) having a probe tip (11) defining the position of the movable point. The measuring probe (10) also has first and second reference points (12, 13) spaced apart from one another and having a fixed known spatial relationship with one another and with the probe tip (11). Means (16) are provided for moving the probe member (10) so that the probe tip may be positioned at any desired point within the measuring volume. At least three distance measuring equipments (15) are provided, located outside the measuring volume at fixed known positions relative to the set of reference axes and each operable to determine the distance between it and each of the reference points (12, 13) on the probe member (10). Calculating means (19) are provided to calculate from said distance measurements the position of the probe tip (11). The distance measuring equipments (15) may be laser rangefinders, with reflectors mounted on the probe member (10) at the reference points (12, 13).

6 Claims, 2 Drawing Figures

THREE-DIMENSIONAL POSITION MEASURING APPARATUS

This invention relates to apparatus for measuring the position of a point in three dimensions relative to a datum point. Apparatus of this type is commonly used for measuring the dimensions of a workpiece, and may take many different forms. Commonly, a suitably-supported worktable is provided on which the workpiece may be mounted. A pair of horizontal guides is fixed relative to the worktable and supports a movable structure. This structure itself carries a further pair of guides, also horizontal but extending at right-angles to the first pair of guides. A movable carriage is mounted on the second pair of guides and carries a probe member which may be moved in a vertical direction. The tip of the probe member is the measuring point which may be moved by the carriage to any point within a measuring volume defined by the construction of the apparatus. Each axis of movement is provided with means for measuring the movement of the probe tip along that axis.

Measuring apparatus of this general type may vary considerably in size and in construction. In a small measuring machine the first guides carrying the movable structure may be located on one side of the worktable, the structure being cantilevered out over the worktable to give the probe the required range of movement. In a large machine a "bridge" structure may run on guides located on opposite sides of the worktable and may support a carriage which moves across the worktable. Other arrangements are also known.

Problems arise when it is neccessary to measure the dimensions of very large objects. As the measuring volume increases so do errors due to bending and twisting of the members supporting the probe member. There are very sophisticated techniques available for correcting such errors, but nevertheless there is a limit to the maximum size of such a measuring machine.

It is an object of the present invention to provide measuring appparatus in which accurate measurements may be made on very large workpieces without the problems referred to above.

According to the present invention there is provided three-dimensional position measuring apparatus for determining the position of a point movable throughout a measuring volume relative to a set of reference axes, which apparatus includes a probe member having a probe tip defining the position of the movable point and first and second reference points spaced apart from one another and having a fixed known spatial relationship with one another and with the probe tip, means for moving the probe member so that the probe tip may be positioned at any desired point within the measuring volume, at least three distance measuring equipments part at least of each being located outside the measuring volume in a separate fixed known position relative to the set of reference axes and each being operable to determine the distance between the fixed known position and each reference point on the probe member, and calculating means responsive to the signals derived by each distance measuring equipment to determine the position of the probe tip relative to the said set of reference axes.

The term "probe tip" as used in this specification and claims includes not only the mechanical type of probe tip which makes physical contact with the workpiece but also noncontracting probes such as the so-called "laser probe".

Figure 2:
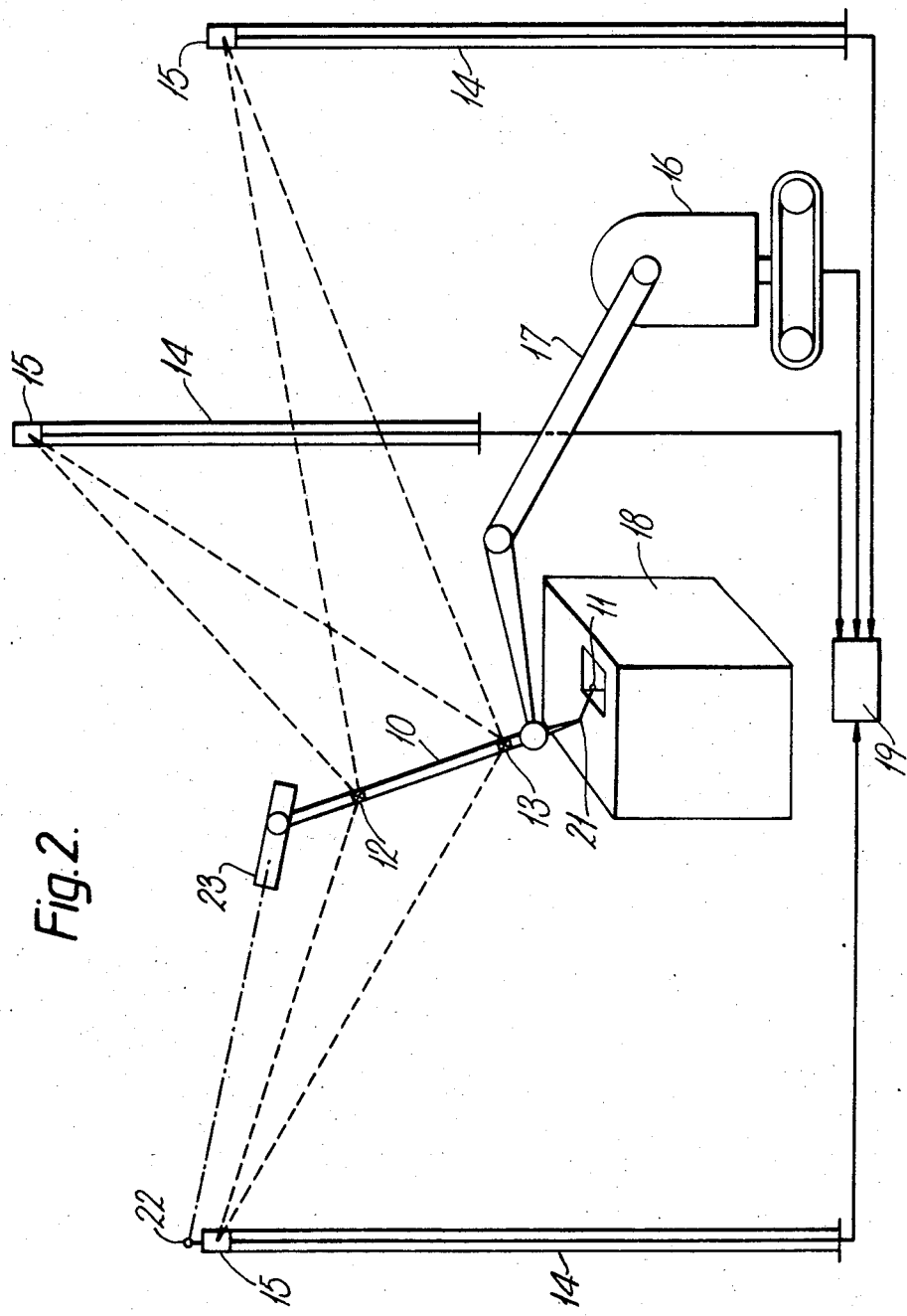

The invention will now be described with reference to the accompanying drawings in which:

FIG. 1 shows a schematic view of the physical arrangement of the components of a system according to a first embodiment of the invention; and FIG. 2 illustrates a second embodiment.

Referring now to FIG. 1, this shows, in schematic form, the main components of the measuring apparatus. The measuring probe 10, shown to a larger scale than the rest of the drawing comprises a rigid member having at one end a probe tip 11. The other end of the probe member 10 carries a first mirror at a first reference point 12, whilst a second mirror is located at the second reference point 13 near to the probe tip 11. The mirrors must be of a type which reflect radiation back along a path close to the incident beam. Corner cube reflectors are one example of a suitable type of mirror.

Around the boundary (not shown) of the measuring volume are three supports 14 each of which carries distance measuring equipment 15 such as laser rangefinders. Each distance measuring equipment comprises two rangefinders, one directed at the mirror at reference point 12 and the other at the mirror at reference point 13. The laser rangefinders are steerable to ensure that they are always pointing towards the probe member 10 to enable measurements to be made. Also shown schematically in the drawing is some form of movable robot 16 which carries the probe member 10 on an articulated arm 17 so that the probe tip 11 may be placed in contact with any desired point on the workpiece 18. Calculating means in the form of a processor 19, is connected to each of the distance measuring equipments.

In operation the probe tip 11 is placed in contact with a desired point on the surface of the workpiece 18. Clearly the direction in which the probe member 10 extends from the probe tip 11 is not fixed. The laser rangefinders 15 carried by each of the supports 14 determines the distance between the rangefinder and the mirror at the appropriate one of the two reference points. The position in space of each reference point may be determined by trilateration, assuming of course that the positions of the rangefinders relative to a datum point are known. Knowing the positions of the two reference points and the spatial relationship between these and the probe tip, it is a simple matter to calculate the position of the probe tip relative to the datum point.

In practical terms it is unlikely that a single mirror mounted at a reference point will be able to reflect light to three or more rangefinders. Even if corner cube reflectors are used these will have to be physically separated from one another. It is therefore more probable that each reflector will be located at a different reference point, giving six separate reference points in the embodiment described above. There must, as before, be a known spatial relationship between all of the reference points and the probe tip. The calculating means will have to supplied with information defining which reference point is being located by each rangefinder to enable the calculations to be performed correctly.

The embodiment of FIG. 1, with the reference points 12 and 13 and the probe tip 11 arranged in a straight line may not be able to carry out measurements inside apertures or recesses in the workpiece 18. FIG. 2 shows a modification which overcomes this problem. The probe tip 11 is extended away from the main part of the probe member 10 on a cranked arm 21 so that it may be positioned inside apertures and recessed. The system of FIG. 1 would not be able to determine the position of the probe without some indication of the rotational alignment of the probe tip about the line joining reference points 12 and 13. FIG. 2 illustrates one way of determining this rotation. A light source or image 22 is mounted on one of the supports 14 and an extension of the probe member 10 beyond reference point 12 carries a tracking telescope 23. A pickoff is provided to indicate the angular position of the telescope 23 relative to the axis of the probe member 10, and the output of this pickoff is applied to the calculating means 18.

In operation, the tracking telescope 23 moves so that it is always pointing at the source or image 22, and the output of the pickoff 23 provides the necessary additional input to the calculating means to enable the position of the probe tip 11 to be determined.

An alternative techniques which may be used if sufficient sets of distance measuring equipment 15 are provided is to carry a further reference point on the probe member 10, on an arm projecting out from the main direction of the probe member. The position of this further reference point could be determined by trilateration as with the other reference points, and allow the position of the probe tip 11 to be calculated.

It will be clear that if only three sets of laser rangefinders 15 are used there will be instances when the path between one of the reference points on the probe member 10 and one or more of the rangefinders 15 is obscured by the workpiece 17 or by the robot 15. In practice, therefore, it will be necessary to provide a larger number of supports 14 carrying the distance measuring equipment 15. It may be necessary to provide eight or more such equipments to ensure that the apparatus will always function. This will also simplify the provision of a tracking system which controls the pointing of the laser rangefinders since it is likely that several will remain correctly aligned for successive positions of the probe member 10 if these positions are close together.

In the above description the measuring probe 10 carries passive reflectors at reference points 12 and 13. These also may have to be movable relative to the probe member to ensure that laser radiation is always reflected back to the rangefinder. Alternatively it may be possible to replace the mirrors by active detectors and to replace the laser rangefinders 15 by laser transmitters. Some form of coding or sequencing could be used to prevent interference between laser radiation from different transmitters.

Laser radiation has been suggested because of its short wavelength and hence the high accuracy of measurement possible. However, it may be possible to use microwave distance measuring equipment in a similar manner.

The calculations necessary to determine the position of the probe tip 11 have not been described in any detail. The use of a trilateration technique to determine the position of a point is itself known, though not for use in apparatus of the type described above. Having determined the position of the two reference points it is a simple matter to determine the position of the probe tip 11.

The robot 16 carrying the measuring probe 11 could be controlled most easily by an operator, probably by remote control. The probe tip 11 will preferably be of a known type in which the tip is resiliently mounted in such a way that deflection of the probe tip on contact with the workpiece stops further movement of the probe member. The deflection is also measured to enable a suitable correction to be applied to the calculated position of the probe tip. Various types of probe are known which do not rely on physical contact between the "probe tip" and the workpiece. Probes of this latter type, such as the so-called "laser probe" are equally suitable for use in the measuring apparatus of the present invention.

What we claim is:

1. Three-dimensional position measuring apparatus for determining the position of a point movable throughout a measuring volume relative to a set of reference axes, which apparatus includes a probe member having a probe tip defining the position of the movable point and first and second reference points spaced apart from one another and having a fixed known spatial relationship with one another and with the probe tip, means for moving the probe member so that the probe tip may be positioned at any desired point within the measuring volume, at least three distance meansuring equipments, each being located outside the measuring volume in a separate fixed known position relative to the set of reference axes and each operable to determine the distance between its known position and each reference point on the probe member, and calculating means responsive to the signals derived by each distance measuring equipment to determine the position of the probe tip relative to the set of reference axes.

2. Apparatus as claimed in claim 1 in which each distance measuring equipment includes at least one laser rangefinder located at each fixed, position, each reference point on the probe member carrying one or more reflectors operable to return to each rangefinder laser radiation transmitted therefrom.

3. Apparatus as claimed in claim 2 which includes tracking means operable to ensure that each laser rangefinder is, in operation, pointing towards the appropriate reference point on the probe member.

4. Apparatus as claimed in claim 1 in which each distance measuring equipment includes a laser transmitter located at each fixed position, each reference point on the probe member carrying detector means operable to detect the laser radiation from each such transmitter.

5. Apparatus as claimed in claim 1 in which the means for moving the probe member includes a robot having an articulated arm carrying the probe member.

6. Apparatus as claimed in claim 1 which includes a tracking telescope carried on the probe member so as to be rotatable about the axis joining the first and second reference points and operable to maintain its alignment with a fixed point outside the measuring volume, and pickoff means operable to indicate to the calculating means the angular position of the tracking telescope about said axis relative to a datum direction.

* * * * *